(12) United States Patent
    Zhu

(10) Patent No.:     US 12,689,957 B2
(45) Date of Patent:          Jul. 21, 2026

(54) METHOD AND APPARATUS FOR DETERMINING HANDOVER CONFIGURATION, AND COMMUNICATION DEVICE

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 358 days.

(21) Appl. No.: 18/273,543

(22) PCT Filed: Jan. 21, 2021

(86) PCT No.: PCT/CN2021/073040
§ 371 (c)(1),
(2) Date: Jul. 20, 2023

(87) PCT Pub. No.: WO2022/155835
PCT Pub. Date: Jul. 28, 2022

(65) Prior Publication Data
US 2024/0098595 A1     Mar. 21, 2024

(51) Int. Cl.
*H04W 36/08*          (2009.01)
*H04W 36/00*          (2009.01)

(52) U.S. Cl.
CPC ..... *H04W 36/083* (2023.05); *H04W 36/0085* (2018.08)

(58) Field of Classification Search
CPC ......... H04W 36/0085; H04W 36/0088; H04W 36/0083; H04W 36/00835; H04W 36/0076
See application file for complete search history.

(56) References Cited

U.S. PATENT DOCUMENTS

| | | | | |
|---|---|---|---|---|
| 2018/0376393 | A1* | 12/2018 | Wu | H04B 7/18521 |
| 2020/0052782 | A1* | 2/2020 | Wang | H04B 7/18541 |
| 2020/0178135 | A1* | 6/2020 | Yun | H04W 36/0061 |
| 2020/0313755 | A1 | 10/2020 | Chuang et al. | |
| 2023/0135073 | A1* | 5/2023 | Xu | H04W 36/00835 |
| | | | | 370/331 |
| 2023/0362741 | A1* | 11/2023 | Li | H04W 36/0016 |

(Continued)

FOREIGN PATENT DOCUMENTS

| | | |
|---|---|---|
| CN | 108112281 A | 6/2018 |
| CN | 108141277 A | 6/2018 |

(Continued)

OTHER PUBLICATIONS

CN Office Action of 202180000238.2 dated Aug. 21, 2023, 11 pages.
International Search Report of PCT/CN2021/073040 dated Mar. 29, 2021 with English translation, (4p).
Qualcomm Inc. "On NTN Initial Search and Handover", 3GPP TSG RAN WG1 #99, R1-1912958, Reno, USA, Nov. 22, 2019, (4p).

(Continued)

*Primary Examiner* — Barry W Taylor
(74) *Attorney, Agent, or Firm* — Arch & Lake LLP

(57)          ABSTRACT

A method and an apparatus for determining handover configuration, and a communication device are provided. The method includes: on the basis of handover configuration information of a target service satellite associated with a cell handover, user equipment (UE) determines handover configuration for performing the cell handover, wherein the UE performs cellular mobile data communication via a satellite signal.

19 Claims, 5 Drawing Sheets

(56)                  References Cited

U.S. PATENT DOCUMENTS

| 2024/0057005 | A1* | 2/2024 | Chen | H04W 56/0045 |
| 2024/0064583 | A1* | 2/2024 | Maattanen | H04W 36/0072 |
| 2024/0155704 | A1* | 5/2024 | Li | H04B 7/18519 |

FOREIGN PATENT DOCUMENTS

| CN | 110972217 | A | 4/2020 |
| CN | 111010708 | A | 4/2020 |
| CN | 111182658 | A | 5/2020 |
| CN | 111211829 | A | 5/2020 |
| CN | 111356185 | A | 6/2020 |
| CN | 111711973 | A | 9/2020 |
| CN | 112106413 | A | 12/2020 |
| WO | 2020163610 | A1 | 8/2020 |
| WO | 2020211687 | A1 | 10/2020 |
| WO | 2020229445 | A1 | 11/2020 |

OTHER PUBLICATIONS

3GPP TR 38.811 V15.4.0. (Sep. 2020) Technical Report, 3rd Generation Partnership Project; Technical Specification Group Radio Access Network; Study on New Radio (NR) to support non-terrestrial networks (Release 15), (127p).

3GPP TR 38.821 V16.2.0 (Mar. 2023) Technical Report, 3rd Generation Partnership Project; Technical Specification Group Radio Access Network; Solutions for NR to support non-terrestrial networks (NTN) (Release 16), (140p).

Huawei, et al., "Considerations on mobility management in NTN", 3GPP TSG-RAN WG2 Meeting #104 R2-1818248 Spokane, US, Nov. 12-16, 2018, (4p).

Sony, "Mobility management in NTN", Mobility management in NTN, 3GPP TSG-RAN WG2 Meeting #112 R2-2009896 Online, Nov. 2020, (2p).

The State Intellectual Property Office of People's Republic of China, "Notification to Grant Patent Right for Invention" issued in Application No. 2021800002382 dated May 22, 2024, (6p).

* cited by examiner

| UE | | Base station |
|---|---|---|

Feeder link communication of a satellite

201: in response to performing of cellular mobile data communication via a satellite signal, handover configuration for a cell handover is determined based on handover configuration information of a target service satellite associated with the cell handover

METHOD AND APPARATUS FOR DETERMINING HANDOVER CONFIGURATION, AND COMMUNICATION DEVICE

CROSS REFERENCE TO RELATED APPLICATION

The present disclosure is the U.S. national phase application of International Application No. PCT/CN2021/073040 filed on Jan. 21, 2021, the content of which is incorporated herein by reference in its entirety for all purposes.

BACKGROUND

In research of wireless cellular mobile communication technology, satellite communication is considered to be an important aspect of future development of the wireless cellular mobile communication technology. Satellite communication refers to the communication carried out by wireless cellular mobile communication devices on the ground using the satellite as a relay. A satellite communication system consists of satellites and ground components. The satellite communication is characterized by a large communication range. Communication can be carried out within the range covered by radio waves emitted by the satellite. The satellite communication is not easily affected by land environment and disasters. The satellite communication can serve as an effective supplement to current terrestrial wireless cellular mobile communication.

SUMMARY

The present disclosure relates, but is not limited, to the field of wireless communication technology, in particular to a method and an apparatus for determining handover configuration, and a communication device.

According to a first aspect of the present disclosure, a method for determining handover configuration is provided by some embodiments. The method is applied to user equipment (UE), and includes: determining, in response to performing of cellular mobile data communication via a satellite signal, handover configuration for a cell handover based on handover configuration information of a target service satellite associated with the cell handover.

According to a second aspect of the present disclosure, a method for transmitting information is provided by some embodiments. The method is applied to a base station, and includes: sending, in response to performing of cellular mobile data communication by user equipment (UE) via a satellite signal, handover configuration information of a target service satellite, wherein the handover configuration information is used for the UE to determine handover configuration for a cell handover.

According to a third aspect of the present disclosure, a method for transmitting information is provided by some embodiments. The method is applied to a base station, and includes: receiving indication information associated with a cell handover, wherein the indication information is sent by user equipment (UE) in response to determination of a target service satellite for the cell handover based on ephemeris information.

According to a fourth aspect the present disclosure, an apparatus for determining handover configuration is provided by some embodiments. The apparatus is applied to user equipment (UE), and includes: a first determination module configured to determine, in response to performing of cellular mobile data communication via a satellite signal, handover configuration for a cell handover based on handover configuration information of a target service satellite associated with the cell handover.

According to a fifth aspect of the present disclosure, an apparatus for transmitting information is provided by some embodiments. The apparatus is applied to a base station, and includes: a second sending module configured to send, in response to performing of cellular mobile data communication by user equipment (UE) via a satellite signal, handover configuration information of a target service satellite, wherein the handover configuration information is used for the UE to determine handover configuration for a cell handover.

According to a sixth aspect of the present disclosure, an apparatus for transmitting information is provided by some embodiments. The apparatus is applied to a base station, and includes: a fifth receiving module configured to receive indication information associated with a cell handover, wherein the indication information is sent by user equipment (UE) in response to determination of a target service satellite for the cell handover based on ephemeris information.

According to a seventh aspect of the present disclosure, a communication equipment device is provided by some embodiments, including a processor, a memory, and executable instructions stored on the memory and capable of running on the processor. When the executable instructions run on the processor, steps of the method for determining handover configuration as described in the first aspect, or the method for transmitting information as described in the second or third aspect are caused to be executed.

The general description above and the detailed description in the following are only illustrative and explanatory, and do not limit embodiments of the present disclosure.

BRIEF DESCRIPTION OF THE DRAWINGS

The drawings herein, which are incorporated in and constitute a part of this specification, illustrate embodiments consistent with the present disclosure and serve together with the specification to explain principles of the present disclosure.

DETAILED DESCRIPTION

Figures 1, 2:
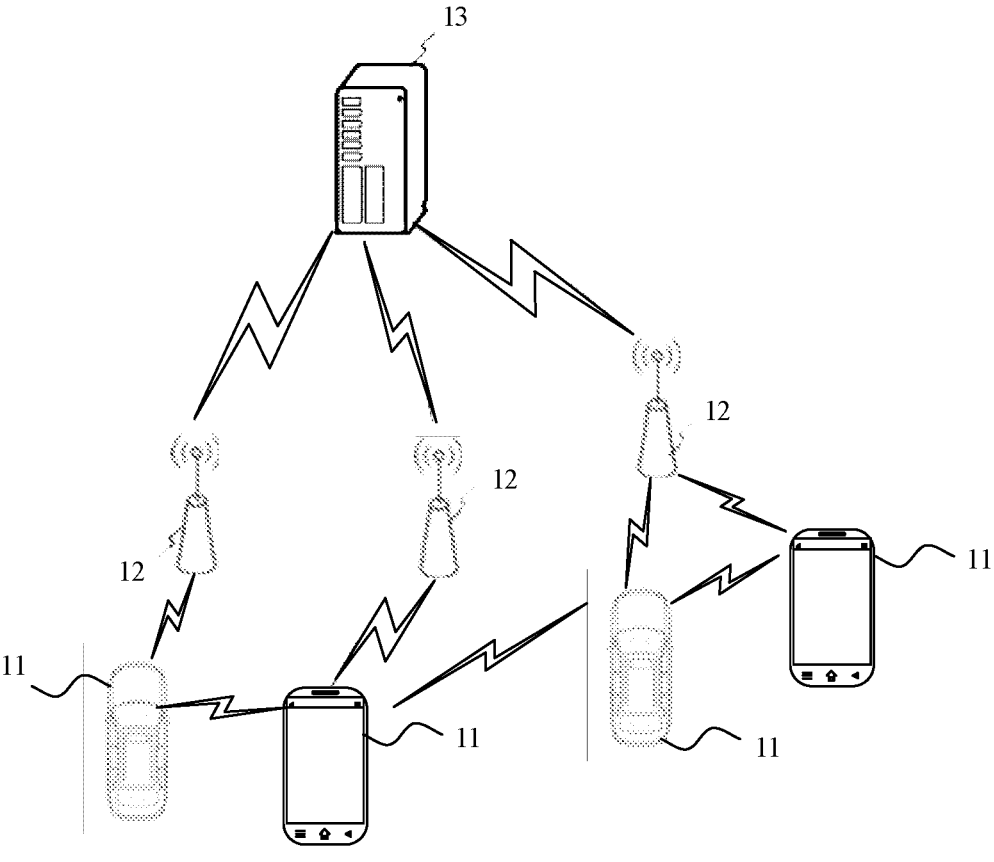
FIG. 1 is a schematic diagram of a structure of a wireless communication system according to exemplary embodiments of the present disclosure.
FIG. 2 is a flowchart of a method for determining handover configuration according to exemplary embodiments of the present disclosure.

Some embodiments will be explained herein in detail, and examples are illustrated in the drawings. When referring to the drawings, unless otherwise indicated in the following descriptions, the same numerals in different drawings represent the same or similar elements. Implementations described in following embodiments do not represent all implementations consistent with the present disclosure. Instead, they are only examples of devices and methods consistent with some aspects of embodiments of the present disclosure as detailed in the attached claims.

Terms used in embodiments disclosed in the present disclosure are for the purpose of description of specific embodiments only, and are not intended to limit the embodiments of the present disclosure. Singular forms such as "a" and "the" used in embodiments of the present disclosure and the attached claims are also intended to include plural forms, unless other meanings are clearly indicated in the context. It should also be understood that the term "and/or" used herein refers to and includes any or all possible combinations of one or more related items listed.

It should be understood that although terms such as first, second, and third may be used to describe various information in embodiments of the present disclosure, these information should not be limited to these terms, which are only used to distinguish information of the same type from each other. For example, without departing from the scope of the present disclosure, the first information can also be referred to as the second information, and similarly, the second information can also be referred to as the first information. The word "if" used herein can be interpreted as "when" or "while" or "in response to determination that", depending on the context.

Reference is made to FIG. 1, which illustrates a schematic diagram of a structure of a wireless communication system provided by embodiments of the present disclosure. As shown in FIG. 1, the wireless communication system is a communication system based on cellular mobile communication technology, which may include several terminals 11 and several base stations 12.

The terminal 11 can be equipment that provides voice and/or data connectivity to a user. The terminal 11 can communicate with one or more core networks via a Radio Access Network (RAN). The terminal 11 can be an IoT (Internet of Things) terminal, for example, a sensor device, a mobile phone (or a "cellular" phone), and a computer with IoT terminals, such as fixed, portable, pocket, handheld, computer built-in, or vehicle mounted devices. For example, stations (STA), subscriber units, subscriber stations, mobile stations, mobiles, remote stations, access points, remote terminals, access terminals, user terminals, user agents, user devices or terminals. Alternatively, the terminal 11 can also be a device for unmanned aerial vehicles. Alternatively, the terminal 11 can also be an onboard device, such as a trip computer with wireless communication ability or wireless communication devices connected to an external trip computer. Alternatively, the terminal 11 can also be a roadside device, such as a street light, a signal light, or other roadside devices with wireless communication ability.

Base station 12 can be a network side device in the wireless communication system. The wireless communication system can be the 4th generation (4G) mobile communication system, also known as Long Term Evolution (LTE) system. Alternatively, the wireless communication system can also be the 5th generation (5G) system, also known as New Radio system or 5G NR system. Alternatively, the wireless communication system can also be the next generation system following 5G system. The access network in 5G system can be referred to as the New Generation-Radio Access Network (NG-RAN). Alternatively, an MTC system.

Base station 12 can be the Evolved Node B (eNB) employed in 4G system. Alternatively, base station 12 can also be the next Generation Node B (gNB) constructed in a centralized and distributed architecture in 5G system. When constructed in the centralized and distributed architecture, base station 12 usually includes a central unit (CU) and at least two distributed units (DUs). The central unit is provided with a protocol stack consisting of the Packet Data Convergence Protocol (PDCP) layer, the Radio Link Control (RLC) layer, and the Medium Access Control (MAC) layer. The distributed unit is provided with a protocol stack of the Physical (PHY) layer. Specific implementations of base station 12 are not limited in embodiments of the present disclosure.

A wireless connection can be established between the base station 12 and the terminal 11 via a wireless air interface. In different implementations, the wireless air interface is based on the 4th generation (4G) mobile communication network technology standard. Alternatively, the wireless air interface is based on the 5th generation (5G) mobile communication network technology standard, for example, the wireless air interface is the New Radio. Alternatively, the wireless air interface can also be a wireless air interface based on the next generation mobile communication network technology standard following 5G.

In some embodiments, an E2E (End to End) connection can also be established between the terminal 11. For example, in vehicle to everything (V2X) communication, there are scenarios where vehicle to vehicle (V2V) communication, vehicle to infrastructure (V2I) communication, and vehicle to pedestrian (V2P) communication are established.

In some embodiments, the wireless communication system described above can also include a network management device 13.

Some of base stations 12 are respectively connected to the network management device 13. The network management device 13 can be a core network device in the wireless communication system, for example, the network management device 13 can be the Mobility Management Entity (MME) in the Evolved Packet Core (EPC). Alternatively, the network management device can also be other core network devices, such as the Service GateWay (SGW), the Public Data Network GateWay (PGW), the Policy and Charging Rules Function (PCRF), or the Home Subscriber Server (HSS). Implementations of the network management device 13 are not limited in embodiments of the present disclosure.

An execution entity involved in embodiments of the present disclosure includes but is not limited to a satellite that achieves a coverage of non-terrestrial cellular mobile communication network, a user device such as a mobile terminal that uses cellular mobile communication network technology for wireless communication, as well as a base station, etc.

An application scenario of embodiments of the present disclosure is non-terrestrial networks (NTN) communication, especially satellite communication, which has been included in the discussion of 3GPP's 5G standard due to its wide coverage, strong disaster resistance, and large capacity.

In the 3GPP "5G New Radio for 'Non-Terrestrial Networks' supported" research project, TR38.811 (Rel-15) reported on the deployment scenarios of NTN networks and research on channel models of NTN networks, and TR38.821 (Rel-16) reported research on an architecture of Next Generation Radio Access Networks (NG-RAN) based on NTN, which also defined and evaluated a solution for a network architecture that integrated NTN network and 5G network. NTN can serve as a supplement to terrestrial networks (5G networks), providing continuous services (such as maritime and high-speed rail) for M2M (Machine to Machine)/IoT (Internet of Things) devices and mobile platform users, enhancing the reliability of 5G networks, alternatively, the scalability of 5G networks can be enhanced by directly providing broadcast or multicast services to user devices at an edge of the network. NTN can also be operated independently to provide unique services for remote areas, isolated islands, etc., making network services ubiquitous.

Due to the high-speed mobility of the satellite, the service time of a satellite is relatively short for user equipment UE, maybe only a few minutes or even less. In this case, the handover of service satellites may cause interruptions in business transmission, thereby affecting system performance. How to enable UE to complete the handover of service satellites without affecting communication is an urgent problem to be solved.

As shown in FIG. 2, exemplary embodiments of the present disclosure provide a method for determining handover configuration, which can be applied to user equipment (UE) in wireless communication. The method includes following steps.

In step 201, in response to performing of cellular mobile data communication via a satellite signal, handover configuration for a cell handover is determined based on handover configuration information of a target service satellite associated with the cell handover.

UE can be a mobile terminal that utilizes cellular mobile communication network technology for NTN wireless communication. UE can establish communication connection with a base station through a feeder link between a high altitude platform such as a satellite and a satellite earth station such as a gateway. In some embodiments, a base station can be a UE's service base station.

A current service satellite can be a service satellite is connected between currently connected base station and UE via the feeder link. The service satellite can transmit direct communication data between the base station and UE through transparent transmission and other means. At the same time, UE can communicate with the base station through one or more service satellites.

The satellite that provides cellular mobile communication signals is usually not a geostationary satellite. Therefore, for an area where UE is located, the service satellites, and/or cells, and/or beams that provide a signal coverage of the cellular mobile communication during different time periods are different. During a communication process, UE needs to perform handover between different service satellites, and/or cells, and/or beams, etc. In some embodiments, a cell handover includes but is not limited to handover between service satellites, and/or cells, and/or beams, etc. In some embodiments, the handover configuration information can be used to indicate the handover configuration for UE to perform the cell handover. The handover configuration for UE to perform the cell handover can include but is not limited to handover targets, conditions, timing, resources, etc., for UE to perform the cell handover. The handover configuration for UE to perform the cell handover can also include information used for determining the handover targets, conditions, timing, resources, etc., for UE to perform the cell handover. In some embodiments, the handover targets can include but are not limited to the target service satellites, cells, beams, etc., of the handover.

UE can perform handover between different cells and/or different beams of the same service satellite. A target service satellite can include but is not limited to the current service satellite of UE, or a service satellite to be accessed other than the current service satellite.

According to embodiments, UE can determine the handover configuration based on the handover configuration information, thereby reducing the occurrence of the handover failure and the communication interruption during the NTN wireless communication due to inability of determining the handover configuration, and improving the communication stability, and thus reducing the handover time and improving transmission performance.

In some embodiments, the method further includes: the handover configuration information of the target service satellite sent by a base station is received.

The handover configuration information can be sent by the base station to UE via the current service satellite. UE can receive the handover configuration information from the current service satellite.

In some embodiments, the base station can send the handover configuration information to UE within a predetermined time range before the current service satellite stops providing services to UE.

That within the predetermined time range before the current service satellite stops providing services to UE can include within the predetermined time range before the current service satellite leaves the current service area.

In some embodiments, the base station can carry the handover configuration information through broadcast public information or a dedicated signaling for the current service satellite.

UE can receive the handover configuration information carried through the broadcast public information or the dedicated signaling.

In some embodiments, the handover configuration information includes at least one of:

satellite identification information used to indicate the target service satellite for the cell handover;

beam information used to indicate a target beam for the cell handover;

cell identification information used to indicate a target cell for the cell handover;

ephemeris information of the target service satellite; and resource configuration information used to indicate a transmission resource of the target service satellite for the cell handover.

In some embodiments, that the handover configuration information of the target service satellite sent by the base station is received includes: satellite identification information sent by the base station is received.

That handover configuration for a cell handover is determined based on handover configuration information of a target service satellite associated with the cell handover includes: the target service satellite for the cell handover is determined based on the satellite identification information.

The handover configuration information can be used to indicate the satellite identification information of a satellite identifier of the service satellite for the handover. The satellite identification information can indicate the satellite identifier of the target service satellite, i.e. a candidate service satellite.

UE can determine the target service satellite for the handover based on the satellite identifier. The target service satellite can include but is not limited to the current service satellite of UE, or service satellites other than the current service satellite.

In some embodiments, if UE performs the handover between two cells of the same service satellite, i.e. the current service satellite, then the target service satellite can be the current service satellite. If UE performs the handover between two cells of different service satellites, then the target service satellite can be different from the current service satellite.

In some embodiments, the method further includes: in response to determination of more than one target service satellite based on the satellite identification information and/or the ephemeris information, one target service satellite for the cell handover is determined from the more than one target service satellite based on a satellite determination rule or a selection instruction from the base station.

The satellite identification information can indicate the satellite identifier of one service satellite, as well as satellite identifiers of two or more service satellites. The handover configuration information can indicate one or more target satellites. UE can also determine the target service satellite based on the ephemeris information. UE can determine at least one target service satellite from the ephemeris.

In response to the handover configuration information indicating multiple target service satellites, UE can determine one target service satellite for the handover from the more than one target service satellite based on the satellite determination rule. The satellite determination rule can be set based on a duration during which UE is covered by the satellite signal, a strength of the satellite signal, etc. For example, a target service satellite with a longer duration during which UE is covered by the satellite signal can be selected as the target service satellite for the handover.

In some embodiments, the base station can also send the selection instruction to UE, notifying UE to select one satellite as the target service satellite for the handover. The base station can select a satellite as the target service satellite for the handover based on the duration during which UE is covered by the satellite signal and the strength of the satellite signal.

In some embodiments, that the handover configuration information of the target service satellite sent by the base station is received includes: beam information sent by the base station is received.

That handover configuration for a cell handover is determined based on handover configuration information of a target service satellite associated with the cell handover includes: a target beam associated with the cell handover is determined based on the beam information.

The target beam indicated by the beam information can be a beam of the current service satellite or a beam of a target service satellite different from the current service satellite.

UE can determine the target beam for the cell handover based on the indication of the beam information.

In some embodiments, that the handover configuration information of the target service satellite sent by the base station is received includes: cell identification information sent by the base station is received.

That handover configuration for a cell handover is determined based on handover configuration information of a target service satellite associated with the cell handover includes: a target cell for the cell handover is determined based on the cell identification information.

The cell identification information can be used to indicate an identifier (ID) of the target cell. A cell ID can be the same or different from a satellite ID. For example, when the base station is located on the satellite, the cell ID can be the same as the satellite ID. When the base station is on the ground, the cell ID can be different from the satellite ID.

The target cell indicated by the cell identification information can be a target cell of the current service satellite that is different from a current service cell of UE, or the target cell can be a target cell of a target service satellite that is different from the current service satellite.

UE can determine the target beam for the cell handover based on the indication of the cell identification information.

In some embodiments, that the handover configuration information of the target service satellite sent by the base station is received includes: ephemeris information sent by the base station is received.

That handover configuration for a cell handover is determined based on handover configuration information of a target service satellite associated with the cell handover includes: the target service satellite for the cell handover is determined based on the ephemeris information.

The ephemeris information is used at least to indicate a flight position and/or a flight speed of at least one service satellite.

UE can determine the target service satellite suitable for UE's current position based on the ephemeris information. For example, UE can select a satellite that has a signal coverage range continuous with that of the current service satellite as the target service satellite for the handover.

In some embodiments, that the handover configuration information of the target service satellite sent by the base station is received includes: resource configuration information sent by the base station is received.

That handover configuration for a cell handover is determined based on handover configuration information of a target service satellite associated with the cell handover includes: a transmission resource of the target service satellite for the cell handover is determined based on the resource configuration information.

The resource configuration information can indicate the transmission resource of the target service satellite, and UE can determine the transmission resource of the target service satellite based on resource configuration information, for subsequent wireless signal measurement or wireless data communication.

In some embodiments, the transmission resource of the target service satellite includes at least one of:

a working frequency point of the target service satellite;

a working bandwidth of the target service satellite; and a random access preamble sequence of the target service satellite.

The resource configuration information can indicate the working frequency point, and/or the working bandwidth, and/or the random access preamble sequence of the target service satellite, and UE can conduct wireless communication based on the working frequency point, and/or the working bandwidth. UE can also perform random access to the target service satellite based on the random access preamble sequence.

By determining the transmission resource of the target service satellite based on the resource configuration information, the occurrence of the communication failure due to the inability of determining the transmission resource of the target service satellite is reduced.

In some embodiments, the base station can send at least one of the satellite identification information, the beam information, the cell identification information, the ephemeris information, and the resource configuration information. UE can determine the target service satellite based on the satellite identification information, and/or determine the target beam based on the beam information, and/or determine the target cell based on the cell identification information, and/or determine the transmission resource based on the resource configuration information. UE can thus obtain the necessary information for the cell handover and complete the cell handover.

In some embodiments, the method further includes: a wireless signal measurement is performed based on the handover configuration, and the cell handover is performed based on a measurement result obtained from the wireless signal measurement.

After determining the handover configuration, for example, after determining the target service satellite, and/or the target beam, and/or the target cell, and/or the transmission resource, UE can perform the wireless signal measurement, and perform the cell handover based on the result of the wireless signal measurement.

In some embodiments, the method further includes: first time indication information indicating handover time is received.

That the wireless signal measurement is performed based on the handover configuration, and the cell handover is performed based on the measurement result obtained from the wireless signal measurement includes: in response to the handover time being reached, the wireless signal measurement is performed based on the handover configuration, and the cell handover is performed based on the measurement result obtained from the wireless signal measurement.

In some embodiments, the handover time of the cell handover can be determined by the base station, and the base station indicates the handover time to the UE through the first indication information.

UE obtains the handover time based on the notification from the base station. At the handover time, the terminal begins to perform measurement and handover processes for the target service satellite based on the handover configuration.

The first indication information can be carried through broadcast signaling or dedicated signaling and can be sent by the base station to the UE.

According to embodiments, UE can perform the handover based on the definite handover time, thereby reducing the resource waste caused by excessive handover due to uncertain about the handover time, or reducing the occurrence of the communication interruption due to failure to handover timely.

In some embodiments, the method further includes: trigger instruction information that triggers the cell handover is received.

That the wireless signal measurement is performed based on the handover configuration, and the cell handover is performed based on the measurement result obtained from the wireless signal measurement includes: in response to receiving the trigger instruction information, the wireless signal measurement is performed based on the handover configuration, and the cell handover is performed based on the measurement result obtained from the wireless signal measurement.

In some embodiments, the handover time of the handover cell can be determined by the base station, and the base station notifies UE to trigger the handover process through the trigger instruction information.

UE receives the trigger instruction information from the base station, and determines based on the trigger instruction information to start the measurement and handover processes for the target service satellite.

According to embodiments, UE performs the handover based on the trigger instruction information, thereby reducing the resource waste caused by excessive handover due to uncertainty about the handover time, or reducing the occurrence of the communication interruption due to failure to handover timely.

In some embodiments, that the trigger instruction information that triggers the cell handover is received includes: a control instruction carrying the trigger instruction information is received.

The trigger instruction information is carried through a dedicated control instruction or other existing control instructions. For example, the trigger instruction information can be carried through a control instruction for scheduling data for transmission. As a result, the utilization efficiency of the control instruction can be improved.

In some embodiments, that the handover configuration for the cell handover is determined based on the handover configuration information of the target service satellite associated with the cell handover includes: the target service satellite for the cell handover is determined based on ephemeris information of the target service satellite.

The ephemeris information is used at least to indicate a flight position and/or a flight speed of at least one service satellite. The ephemeris information can be obtained in advance by UE. For example, UE can obtain the ephemeris information from the core network, etc., when UE is within the signal coverage range of a terrestrial base station.

UE can determine the target service satellite suitable for UE's current position based on the ephemeris information. For example, UE can select a satellite that has a signal coverage range continuous with that of the current service satellite as the target service satellite for the handover.

According to embodiments, UE can determine the target service satellite based on the handover configuration information, thereby reducing the occurrence of the handover failure and the communication interruption during the NTN wireless communication due to inability of determining the target service satellite, and improving the communication stability.

In some embodiments, the method further includes: in response to determination of the target service satellite for the cell handover, a wireless signal measurement is performed on the target service satellite, and the cell handover is performed based on a measurement result obtained from the wireless signal measurement.

After determining the target service satellite, UE can perform the wireless signal measurement on the target service satellite and perform the handover based on the measurement result obtained from the wireless signal measurement. In some embodiments, the handover can include handover for the service satellite, and/or handover for the cell, and/or handover for the beam, etc.

UE can perform the handover within the predetermined time range before the current service satellite stops providing services to UE.

That within the predetermined time range before the current service satellite stops providing services to UE can include within the predetermined time range before the current service satellite leaves the current service area.

According to embodiments, UE can determine the target service satellite based on the handover configuration information, thereby reducing the occurrence of the handover failure and the communication interruption during the NTN wireless communication due to inability of determining the target service satellite, and improving the communication stability.

In some embodiments, the method further includes: in response to determination of the target service satellite for the cell handover, indication information associated with the cell handover is sent to the base station.

The handover is performed in response to an instruction from the base station. The indication information associated with the cell handover can be used to indicate that UE requests for the handover, etc. For example, UE requests the base station to indicate the time for handover, etc.

In response to the autonomous handover by the UE, the indication information associated with the cell handover can be used to indicate that the UE has started the handover, and/or the UE is performing the handover, and/or the UE has completed the handover, etc.

As a result, that the base station can determine a state of UE during the handover can be ensured.

When receiving the indication information associated with the cell handover, the base station can determine the possibility that UE performs the handover. The uplink and downlink data transmission or measurement between the current service satellite and UE can be stopped, which reduces the occurrence of failures of the uplink and downlink data transmission or wireless signal measurement due to the handover by UE, and improves the communication stability.

In some embodiments, the method further includes: second time indication information indicating the cell handover time sent by the base station in response to the indication information is received.

In some embodiments, in response to the cell handover time being reached, the wireless signal measurement is performed on the target service satellite, and the cell handover is performed based on the measurement result obtained from the wireless signal measurement.

The handover is performed in response to an instruction from the base station. The indication information associated with the cell handover can be used to indicate that UE requests for the handover, etc.

After receiving the indication information, the base station determines the cell handover time when UE performs the measurement and the handover process of the service satellite, and notifies the UE through the second time indication information.

UE performs the handover at the handover time indicated by the base station.

In some embodiments, that the indication information associated with the cell handover is sent to the base station includes: in response to a duration to an end of service time of a current service satellite being greater than or equal to a duration threshold, the indication information associated with the cell handover is sent to the base station.

The duration threshold can be based on a duration during which UE performs the handover and a duration during which UE performs other necessary communication, for example, the time difference between sending of the indication information for requesting the handover and receiving of the instruction from the base station instructing to perform the handover.

The time when the current service satellite stops providing services to UE can include the time when the current service satellite leaves the current service area.

By setting the duration threshold, that the UE has sufficient time to request the handover from the base station, and/or that the UE has sufficient duration for the handover can be ensured, thereby improving the success rate of the handover.

Figure 3:
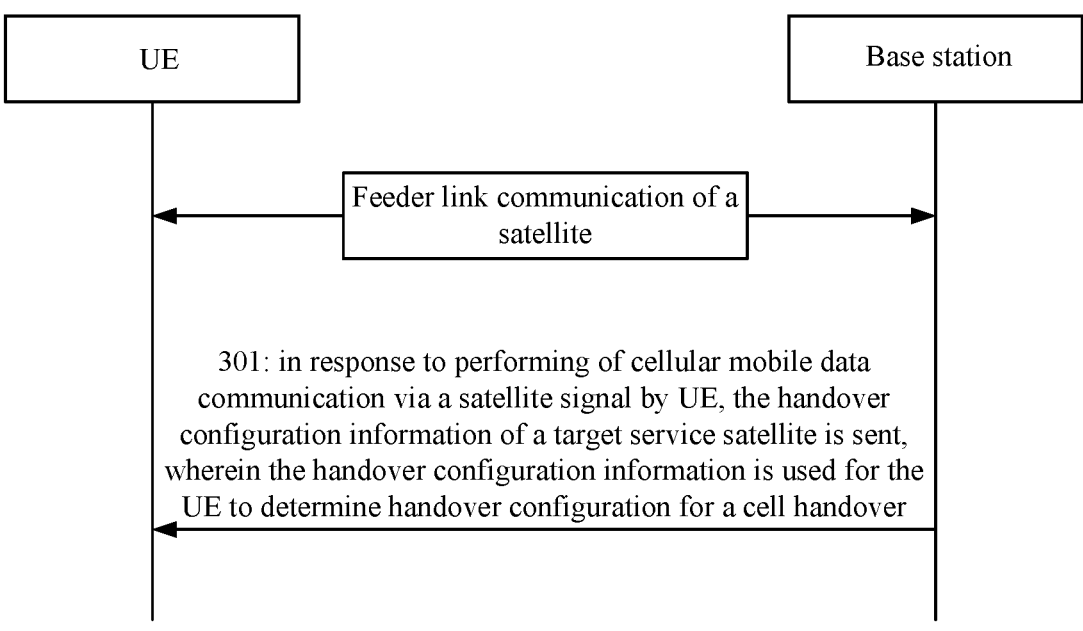
FIG. 3 is a flowchart of a method for transmitting information according to exemplary embodiments of the present disclosure.

As shown in FIG. 3, exemplary embodiments of the present disclosure provide a method for transmitting information, which can be applied to a base station in wireless communication. The method includes following steps.

In step 301, in response to performing of cellular mobile data communication via a satellite signal by user equipment (UE), the handover configuration information of a target service satellite is sent, wherein the handover configuration information is used for the UE to determine handover configuration for a cell handover.

UE can be a mobile terminal that utilizes cellular mobile communication network technology for NTN wireless communication. UE can establish a communication connection with a base station through a feeder link between a high altitude platform such as a satellite and a satellite earth station such as a gateway. In some embodiments, a base station can be a UE's service base station.

A current service satellite can be a service satellite is connected between currently connected base station and UE via the feeder link. The service satellite can transmit direct communication data between the base station and UE through transparent transmission and other means. At the same time, UE can communicate with the base station through one or more service satellites.

The satellite that provides cellular mobile communication signals is usually not a geostationary satellite. Therefore, for an area where UE is located, the service satellites, and/or cells, and/or beams that provide a signal coverage of the cellular mobile communication during different time periods are different. During a communication process, UE needs to perform handover between different service satellites, and/or cells, and/or beams, etc. In some embodiments, a cell handover includes but is not limited to handover between service satellites, and/or cells, and/or beams, etc. In some embodiments, the handover configuration information can be used to indicate the handover configuration for UE to perform the cell handover. The handover configuration for UE to perform the cell handover can include but is not limited to handover targets, conditions, timing, resources, etc., for UE to perform the cell handover. The handover configuration for UE to perform the cell handover can also include information used for determining the handover targets, conditions, timing, resources, etc., for UE to perform the cell handover. In some embodiments, the handover targets can include but are not limited to the target service satellites, cells, beams, etc., of the handover.

UE can perform handover between different cells and/or different beams of the same service satellite. A target service satellite can include but is not limited to the current service satellite of UE, or a service satellite to be accessed other than the current service satellite.

According to embodiments, UE can determine the handover configuration based on the handover configuration information, thereby reducing the occurrence of the handover failure and the communication interruption during the NTN wireless communication due to inability of determining the handover configuration, and improving the communication stability, and thus reducing the handover time and improving transmission performance.

In some embodiments, the base station can send the handover configuration information to UE within a predetermined time range before the current service satellite stops providing services to UE.

That within the predetermined time range before the current service satellite stops providing services to UE can include within the predetermined time range before the current service satellite leaves the current service area.

In some embodiments, the base station can carry the handover configuration information through broadcast public information or a dedicated signaling for the current service satellite.

UE can receive the handover configuration information carried through the broadcast public information or the dedicated signaling.

In some embodiments, the handover configuration information includes at least one of:

satellite identification information used to indicate a target service satellite for the cell handover;

beam information used to indicate a target beam for the cell handover;

cell identification information used to indicate a target cell for the cell handover;

ephemeris information used to indicate the target service satellite for the cell handover; and resource configuration information used to indicate a transmission resource of the target service satellite for the cell handover.

The handover configuration information can be used to indicate the satellite identification information of the satellite identifier of the service satellite for the handover. The satellite identification information can indicate the satellite identifier of the target service satellite, i.e. a candidate service satellite.

UE can determine the target service satellite for the handover based on the satellite identifier. The target service satellite can include but is not limited to the current service satellite of UE, or service satellites other than the current service satellite.

In some embodiments, if UE performs the handover between two cells of the same service satellite, i.e. the current service satellite, then the target service satellite can be the current service satellite. If UE performs the handover between two cells of different service satellites, then the target service satellite can be different from the current service satellite.

In some embodiments, in response to inclusion of the satellite identification information used to indicate the target service satellite for the cell handover by the handover configuration information, the method further includes: a selection instruction is sent. In some embodiments, the selection instruction is used for UE to determine one target service satellite for the cell handover, from more than one target service satellite determined based on the satellite identification information and/or the ephemeris information.

The satellite identification information can indicate the satellite identifier of one service satellite, as well as satellite identifiers of two or more service satellites. The handover configuration information can indicate one or more target satellites. UE can also determine the target service satellite based on the ephemeris information. UE can determine at least one target service satellite from the ephemeris.

In response to the handover configuration information indicating multiple target service satellites, UE can determine one target service satellite for the handover from the more than one target service satellite based on the satellite determination rule. The satellite determination rule can be set based on a duration during which UE is covered by the satellite signal, a strength of the satellite signal, etc. For example, a target service satellite with a longer duration during which UE is covered by the satellite signal can be selected as the target service satellite for the handover.

In some embodiments, the base station can also send the selection instruction to UE, notifying UE to select one satellite as the target service satellite for the handover. The base station can select a satellite as the target service satellite for the handover based on the duration during which UE is covered by the satellite signal and the strength of the satellite signal.

The target beam indicated by the beam information can be a beam of the current service satellite or a beam of a target service satellite different from the current service satellite.

UE can determine the target beam for the cell handover based on the indication of the beam information.

The cell identification information can be used to indicate an identifier (ID) of the target cell. A cell ID can be the same or different from a satellite ID. For example, when the base station is located on the satellite, the cell ID can be the same as the satellite ID. When the base station is on the ground, the cell ID can be different from the satellite ID.

The target cell indicated by the cell identification information can be a target cell of the current service satellite that is different from a current service cell of UE, or the target cell can be a target cell of a target service satellite that is different from the current service satellite.

UE can determine the target beam for the cell handover based on the indication of the cell identification information.

The ephemeris information is used at least to indicate a flight position and/or a flight speed of at least one service satellite.

UE can determine the target service satellite suitable for UE's current position based on the ephemeris information. For example, UE can select a satellite that has a signal coverage range continuous with that of the current service satellite as the target service satellite for the handover.

The resource configuration information can indicate the transmission resource of the target service satellite, and UE can determine the transmission resource of the target service satellite based on resource configuration information, for subsequent wireless signal measurement or wireless data communication.

In some embodiments, the transmission resource of the target service satellite includes at least one of:

a working frequency point of the target service satellite;

a working bandwidth of the target service satellite; and a random access preamble sequence of the target service satellite.

The resource configuration information can indicate the working frequency point, and/or the working bandwidth, and/or the random access preamble sequence of the target service satellite, and UE can conduct wireless communication based on the working frequency point, and/or the working bandwidth. UE can also perform random access to the target service satellite based on the random access preamble sequence.

By determining the transmission resource of the target service satellite based on the resource configuration information, the occurrence of the communication failure due to inability of determining the transmission resource of the target service satellite is reduced.

In some embodiments, the base station can send at least one of the satellite identification information, the beam information, the cell identification information, the ephemeris information, and the resource configuration information. UE can determine the target service satellite based on the satellite identification information, and/or determine the target beam based on the beam information, and/or determine the target cell based on the cell identification information, and/or determine the transmission resource based on the resource configuration information. UE can thus obtain the necessary information for the cell handover and complete the cell handover.

After determining the handover configuration, for example, after determining the target service satellite, and/or the target beam, and/or the target cell, and/or the transmission resource, UE can perform the wireless signal measurement, and perform the cell handover based on the result of the wireless signal measurement.

In some embodiments, the method further includes: first time indication information indicating handover time for UE to perform the cell handover is sent.

In some embodiments, the handover time of the cell handover can be determined by the base station, and the base station indicates the handover time to the UE through the first indication information.

UE obtains the handover time based on the notification from the base station. At the handover time, the terminal begins to perform measurement and handover processes for the target service satellite based on the handover configuration.

The first indication information can be carried through broadcast signaling or dedicated signaling and can be sent by the base station to the UE.

According to embodiments, UE can perform the handover based on the definite handover time, thereby reducing the resource waste caused by excessive handover due to uncertain about the handover time, or reducing the occurrence of the communication interruption due to failure to handover timely.

In some embodiments, the method further includes: trigger instruction information that instructs UE to perform the cell handover is sent.

In some embodiments, the handover time of the handover cell can be determined by the base station, and the base station notifies UE to trigger the handover process through the trigger instruction information.

UE receives the trigger instruction information from the base station, and determines based on the trigger instruction information to start the measurement and handover processes for the target service satellite.

According to embodiments, UE performs the handover based on the trigger instruction information, thereby reducing the resource waste caused by excessive handover due to uncertain about the handover time, or reducing the occurrence of the communication interruption due to failure to handover timely.

In some embodiments, that trigger instruction information that instructs UE to perform the cell handover is sent includes: a control instruction carrying the trigger instruction information is sent.

The trigger instruction information is carried through a dedicated control instruction or other existing control instructions. For example, the trigger instruction information can be carried through a control instruction for scheduling data for transmission. As a result, the utilization efficiency of the control instruction can be improved.

Figure 4:
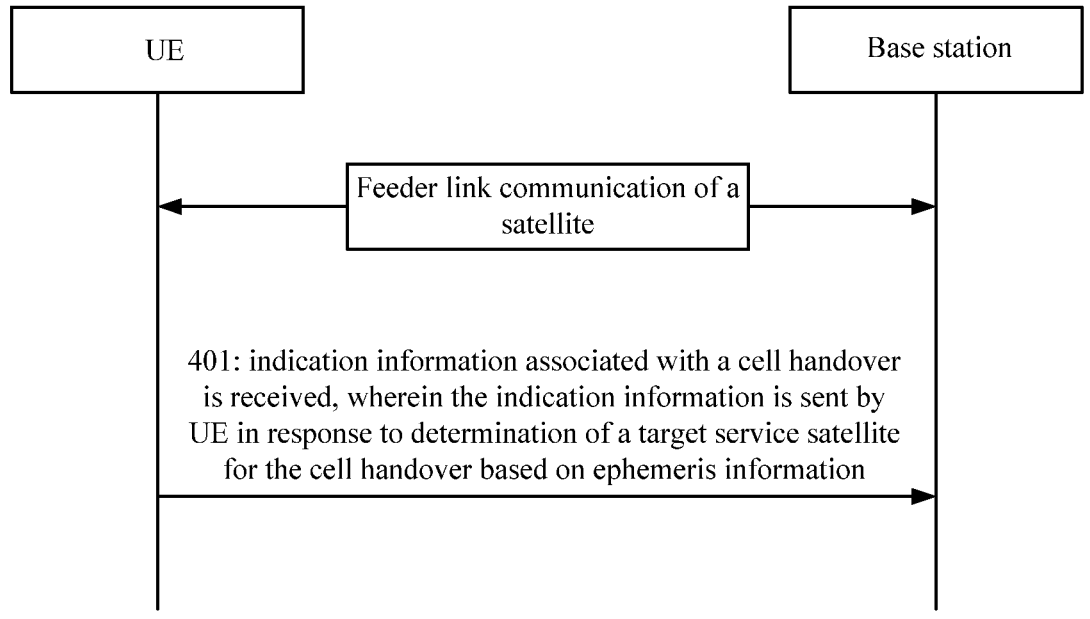
FIG. 4 is a flowchart of a method for transmitting information according to exemplary embodiments of the present disclosure.

As shown in FIG. 4, exemplary embodiments of the present disclosure provide a method for transmitting information, which can be applied to a base station in wireless communication. The method includes following steps.

In step 401, indication information associated with a cell handover is received, wherein the indication information is sent by user equipment (UE) in response to determination of a target service satellite for the cell handover based on ephemeris information.

UE can be a mobile terminal that utilizes cellular mobile communication network technology for NTN wireless communication. UE can establish communication connection with a base station through a feeder link between a high altitude platform such as a satellite and a satellite earth station such as a gateway. In some embodiments, a base station can be a UE's service base station.

A current service satellite can be a service satellite is connected between currently connected base station and UE via the feeder link. The service satellite can transmit direct communication data between the base station and UE through transparent transmission and other means. At the same time, UE can communicate with the base station through one or more service satellites.

The satellite that provides cellular mobile communication signals is usually not a geostationary satellite. Therefore, for an area where UE is located, the service satellites, and/or cells, and/or beams that provide a signal coverage of the cellular mobile communication during different time periods are different. During a communication process, UE needs to perform handover between different service satellites, and/or cells, and/or beams, etc. In some embodiments, a cell handover includes but is not limited to handover between service satellites, and/or cells, and/or beams, etc. In some embodiments, the handover configuration information can be used to indicate the handover configuration for UE to perform the cell handover. The handover configuration for UE to perform the cell handover can include but is not limited to handover targets, conditions, timing, resources, etc., for UE to perform the cell handover. The handover configuration for UE to perform the cell handover can also include information used for determining the handover targets, conditions, timing, resources, etc., for UE to perform the cell handover. In some embodiments, the handover targets can include but are not limited to the target service satellites, cells, beams, etc., of the handover.

The ephemeris information is used at least to indicate a flight position and/or a flight speed of at least one service satellite. The ephemeris information can be obtained in advance by UE. For example, UE can obtain the ephemeris information from the core network, etc., when UE is within the signal coverage range of a terrestrial base station.

UE can determine the target service satellite suitable for UE's current position based on the ephemeris information. For example, UE can select a satellite that has a signal coverage range continuous with that of the current service satellite as the target service satellite for the handover.

According to embodiments, UE can determine the target service satellite based on the handover configuration information, thereby reducing the occurrence of the handover failure and the communication interruption during the NTN wireless communication due to inability of determining the target service satellite, and improving the communication stability.

After determining the target service satellite, UE can perform the wireless signal measurement on the target service satellite and perform the handover based on the measurement result obtained from the wireless signal measurement. In some embodiments, the handover can include handover for the service satellite, and/or handover for the cell, and/or handover for the beam, etc.

UE can perform the handover within the predetermined time range before the current service satellite stops providing services to UE.

That within the predetermined time range before the current service satellite stops providing services to UE can include within the predetermined time range before the current service satellite leaves the current service area.

According to some embodiments of the present disclosure, UE can determine the target service satellite based on the handover configuration information, thereby reducing the occurrence of the handover failure and the communication interruption during the NTN wireless communication due to inability of determining the target service satellite, and improving the communication stability.

In response to determination of the target service satellite for the cell handover, UE can send indication information associated with the cell handover to the base station.

The handover is performed in response to an instruction from the base station. The indication information associated with the cell handover can be used to indicate that UE requests for the handover, etc. For example, UE requests the base station to indicate the time for handover, etc.

In response to the autonomous handover by the UE, the indication information associated with the cell handover can be used to indicate that the UE has started the handover, and/or the UE is performing the handover, and/or the UE has completed the handover, etc.

As a result, that the base station can determine a state of UE during the handover can be ensured.

In some embodiments, the method further includes at least one of:

in response to receiving the indication information, scheduling of data transmission between UE and a UE's current service satellite is stopped; and in response to receiving the indication information, scheduling of a wireless signal measurement on the UE's current service satellite performed by UE is stopped.

When receiving the indication information associated with the cell handover, the base station can determine the possibility that UE performs the handover. The uplink and downlink data transmission or measurement between the current service satellite and UE can be stopped, which reduces the occurrence of failures of the uplink and downlink data transmission or wireless signal measurement due to the handover by UE, and improves the communication stability.

In some embodiments, the method further includes: second time indication information indicating handover time for UE to perform the cell handover is sent. The handover is performed in response to an instruction from the base station. The indication information associated with the cell handover can be used to indicate that UE requests for the handover, etc.

After receiving the indication information, the base station determines the cell handover time when UE performs the measurement and the handover process of the service satellite, and notifies the UE through the second time indication information.

UE performs the handover at the handover time indicated by the base station.

A duration threshold can be based on a duration during which UE performs the handover and a duration during which UE performs other necessary communication, for example, the time difference between sending of the indication information for requesting the handover and receiving of the instruction from the base station instructing to perform the handover.

The time when the current service satellite stops providing services to UE can include the time when the current service satellite leaves the current service area.

By setting the duration threshold, that the UE has sufficient time to request the handover from the base station, and/or that the UE has sufficient duration for the handover can be ensured, thereby improving the success rate of the handover.

A specific example in conjunction with any of the above embodiments will be provided in the following.

UE such as a terminal performs fast service satellite handover based on a predefined method or a method notified by the base station. Embodiments of the present disclosure provide a method of fast service satellite handover. Based on the same principle, the method provided in embodiments of the present disclosure can also be applied to handover of different service beams within the same service satellite.

Method 1: A Method Based on a Notification of a Base Station

Within a predefined time range before the current service satellite is about to leave the service area, relevant configuration information of a new service satellite is notified through broadcasting public information. The configuration information includes:

1. ID information of the new service satellite. The new service satellite can be one service satellite or multiple service satellites. When there are multiple new service satellites, the terminal can also determine an optimal satellite as the service satellite from multiple candidate service satellites based on predefined rules or through the notification of the base station.

2. Beam information of the new service beam.

3. Cell ID information, which can be the same as or different from the satellite ID. For example, when the base station is located on a satellite, the cell ID can be the satellite ID, and when the base station is on the ground, the cell ID cannot be the satellite ID.

4. Ephemeris information of the service satellite.

5. Resource configuration information for accessing a new service satellite, including the working frequency point, the working bandwidth, and the preamble sequence used for random access using the new service satellite.

Within the predefined time, the terminal performs measurement and handover for the new service satellite.

In an implementation, the terminal obtains a starting position of the predefined time based on the notification from the base station. After the starting position of the predefined time, the terminal begins to perform measurement and handover processes for the new service satellite.

In another implementation, the terminal receives the trigger instruction from the base station and determines to start the measurement and handover processes for the new service satellite based on the trigger instruction. The trigger instruction can be a dedicated trigger instruction, or transmitted together with other control instructions or control instructions for scheduling data.

Method 2: A Predefined Method

According to the method, the terminal obtains the ephemeris information of the service satellite in advance and determines a new service satellite. The terminal reports the indication information to the base station within the predefined time before the current service satellite stops providing service. The indication information is used to notify the base station that the terminal is about to start to perform measurement and handover processes for the service satellite.

In an implementation, after receiving the indication information, the base station determines and notifies the terminal the time information for the terminal to perform the measurement and handover processes for the service satellite.

In another implementation, after receiving the indication information, the base station determines that the terminal is about to perform the measurement and handover processes for the service satellite, and no longer schedules the terminal to perform uplink and downlink transmission or measurement operations for the current service satellite.

Figure 5:
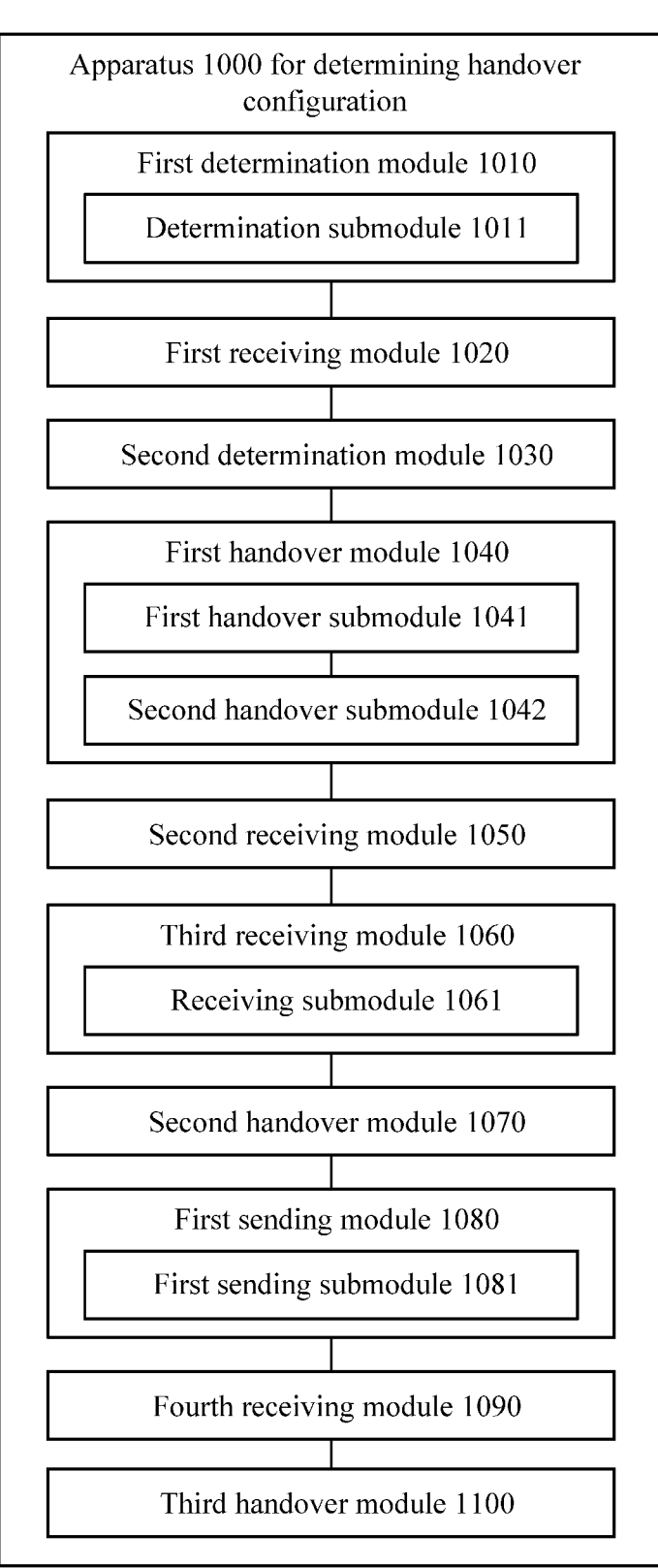
FIG. 5 is a block diagram of an apparatus for determining handover configuration according to exemplary embodiments of the present disclosure.

Embodiments of the present disclosure also provide an apparatus for determining handover configuration, which is applied in user equipment (UE), as shown in FIG. 5. The apparatus 1000 for determining handover configuration includes a first determination module 1010.

In some embodiments, the first determination module 1010 is configured to determine, in response to performing of cellular mobile data communication via a satellite signal, handover configuration for a cell handover based on handover configuration information of a target service satellite associated with the cell handover.

In some embodiments, the apparatus 1000 further includes a first receiving module 1020.

The first receiving module 1020 is configured to receive the handover configuration information of the target service satellite sent by a base station.

In some embodiments, the handover configuration information includes at least one of:

satellite identification information used to indicate the target service satellite for the cell handover;

beam information used to indicate a target beam for the cell handover;

cell identification information used to indicate a target cell for the cell handover;

ephemeris information of the target service satellite; and resource configuration information used to indicate a transmission resource of the target service satellite for the cell handover.

In some embodiments, the apparatus 1000 further includes a second determination module 1030.

The second determination module 1030 is configured to determine, in response to determination of more than one target service satellite based on the satellite identification information and/or the ephemeris information, from the more than one target service satellite for the cell handover, based on a satellite determination rule or a selection instruction from the base station.

In some embodiments, the transmission resource of the target service satellite includes at least one of:

a working frequency point of the target service satellite;

a working bandwidth of the target service satellite; and a random access preamble sequence of the target service satellite.

In some embodiments, the apparatus 1000 further includes a first handover module 1040.

The first handover module 1040 is configured to perform a wireless signal measurement based on the handover configuration, and to perform the cell handover based on a measurement result obtained from the wireless signal measurement.

In some embodiments, the apparatus 1000 further includes a second receiving module 1050.

The second receiving module 1050 is configured to receive first time indication information indicating handover time.

The first handover module 1040 includes a first handover submodule 1041.

The first handover submodule 1041 is configured to perform, in response to the handover time being reached, the wireless signal measurement based on the handover configuration, and to perform the cell handover based on the measurement result obtained from the wireless signal measurement.

In some embodiments, the apparatus 1000 further includes a third receiving module 1060.

The third receiving module 1060 is configured to receive trigger instruction information that triggers the cell handover.

The first handover module 1040 includes a second handover submodule 1042.

The second handover submodule 1042 is configured to perform, in response to receiving the trigger instruction information, the wireless signal measurement based on the handover configuration, and to perform the cell handover based on the measurement result obtained from the wireless signal measurement.

In some embodiments, the third receiving module 1060 includes a receiving submodule 1061.

The receiving submodule 1061 is configured to receive a control instruction carrying the trigger instruction information.

In some embodiments, the first determination module 1010 includes a determination submodule 1011.

The determination submodule 1011 is configured to determine the target service satellite for the cell handover based on ephemeris information of the target service satellite.

In some embodiments, the apparatus 1000 further includes a second handover module 1070.

The second handover module 1070 is configured to perform, in response to determination of the target service satellite for the cell handover, a wireless signal measurement on the target service satellite, and to perform the cell handover based on a measurement result obtained from the wireless signal measurement.

In some embodiments, the apparatus 1000 further includes a first sending module 1080.

The first sending module 1080 is configured to send, in response to determination of the target service satellite for the cell handover, indication information associated with the cell handover to a base station.

In some embodiments, the apparatus 1000 further includes a fourth receiving module 1090 and a third handover module 1100.

The fourth receiving module 1090 is configured to receive second time indication information indicating cell handover time sent by the base station in response to the indication information.

The third handover module 1100 is configured to perform, in response to the cell handover time being reached, a wireless signal measurement on the target service satellite, and to perform the cell handover based on a measurement result obtained from the wireless signal measurement.

In some embodiments, the first sending module 1080 includes a first sending submodule 1081.

The first sending submodule 1081 is configured to send, in response to a duration to an end of service time of a current service satellite being greater than or equal to a duration threshold, the indication information associated with the cell handover to the base station.

Figure 6:
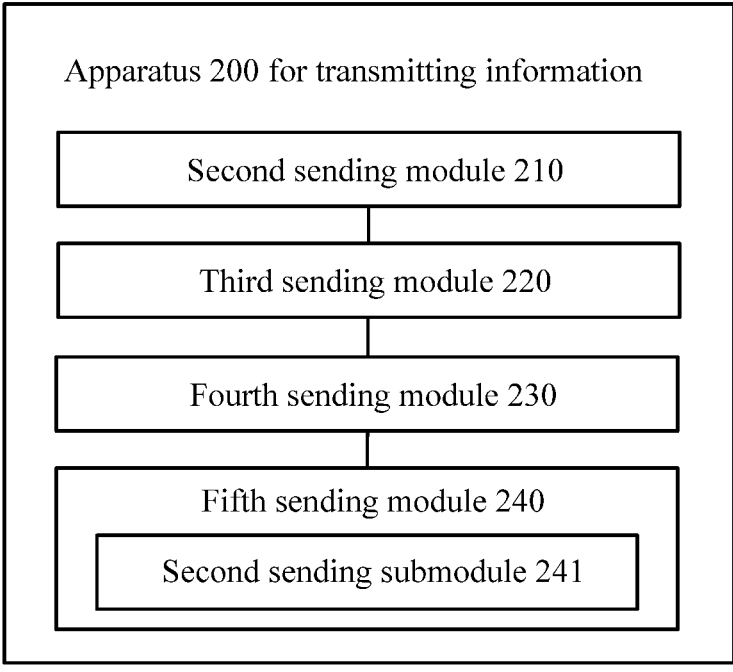
FIG. 6 is a block diagram of an apparatus for transmitting information according to exemplary embodiments of the present disclosure.

Embodiments of the present disclosure also provide an apparatus for transmitting information, which is applied in a base station, as shown in FIG. 6. The apparatus 200 for transmitting information includes a second sending module 210.

The second sending module 210 is configured to send, in response to performing of cellular mobile data communication by user equipment (UE) via a satellite signal, handover configuration information of a target service satellite, wherein the handover configuration information is used for the UE to determine handover configuration for a cell handover.

In some embodiments, the handover configuration information includes at least one of:

satellite identification information used to indicate the target service satellite for the cell handover;

beam information used to indicate a target beam for the cell handover;

cell identification information used to indicate a target cell for the cell handover;

ephemeris information used to indicate the target service satellite for the cell handover; and resource configuration information used to indicate a transmission resource of the target service satellite for the cell handover.

In some embodiments, in response to inclusion of the satellite identification information used to indicate the target service satellite for the cell handover by the handover configuration information, the apparatus 200 further includes a third sending module 220.

The third sending module 220 is configured to send a selection instruction, wherein the selection instruction is used for the UE to determine one target service satellite for the cell handover from more than one target service satellite determined based on the satellite identification information and/or the ephemeris information.

In some embodiments, the transmission resource of the target service satellite includes at least one of:

a working frequency point of the target service satellite;

a working bandwidth of the target service satellite; and a random access preamble sequence of the target service satellite.

In some embodiments, the apparatus 200 further includes a fourth sending module 230.

The fourth sending module 230 is configured to send first time indication information indicating handover time for the UE to perform the cell handover.

In some embodiments, the apparatus 200 further includes a fifth sending module 240.

The fifth sending module 240 is configured to send trigger instruction information that instructs the UE to perform the cell handover.

In some embodiments, the fifth sending module 240 includes a second sending submodule 241.

The second sending submodule 241 is configured to send a control instruction carrying the trigger instruction information.

Figure 7:
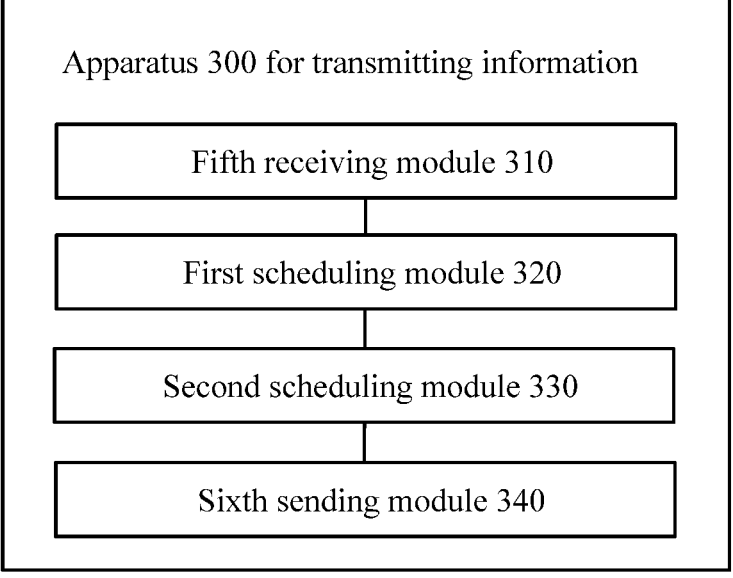
FIG. 7 is a block diagram of an apparatus for transmitting information according to exemplary embodiments of the present disclosure.

Embodiments of the present disclosure also provide an apparatus for transmitting information, which is applied in a base station, as shown in FIG. 7. The apparatus 300 for transmitting information includes a fifth receiving module 310.

The fifth receiving module 310 is configured to receive indication information associated with a cell handover, wherein the indication information is sent by user equipment (UE) in response to determination of a target service satellite for the cell handover based on ephemeris information.

In some embodiments, the apparatus 300 further includes at least one of a first scheduling module 320 and a second scheduling module 330.

The first scheduling module 320 is configured to stop, in response to receiving the indication information, scheduling of data transmission between the UE and a UE's current service satellite.

The second scheduling module 330 is configured to stop, in response to receiving the indication information, scheduling of a wireless signal measurement on the UE's current service satellite performed by the UE.

In some embodiments, the apparatus 300 further includes a sixth sending module 340.

The sixth sending module 340 is configured to send second time indication information indicating handover time for the UE to perform the cell handover.

In exemplary embodiments, the first determination module 1010, the first receiving module 1020, the second determination module 1030, the first handover module 1040, the second receiving module 1050, the third receiving module 1060, the second handover module 1070, the first sending module 1080, the fourth receiving module 1090, the third handover module 1100, the second sending module 210, the third sending module 220, the fourth sending module 230, the fifth sending module 240, the fifth receiving module 310, the first scheduling module 320, the second scheduling module 330, and the sixth sending module 340 can be realized by one or more central processing units (CPUs), graphics processing units (GPUs), baseband processors (BPs), application specific integrated circuits (ASICs), DSPs, programmable logic devices (PLDs), complex programmable logic devices (CPLDs), field programmable gate arrays (FPGAs), general-purpose processors, controllers, micro controller units (MCUs), microprocessors, or other electronic devices, for performing aforementioned methods.

Figure 8:
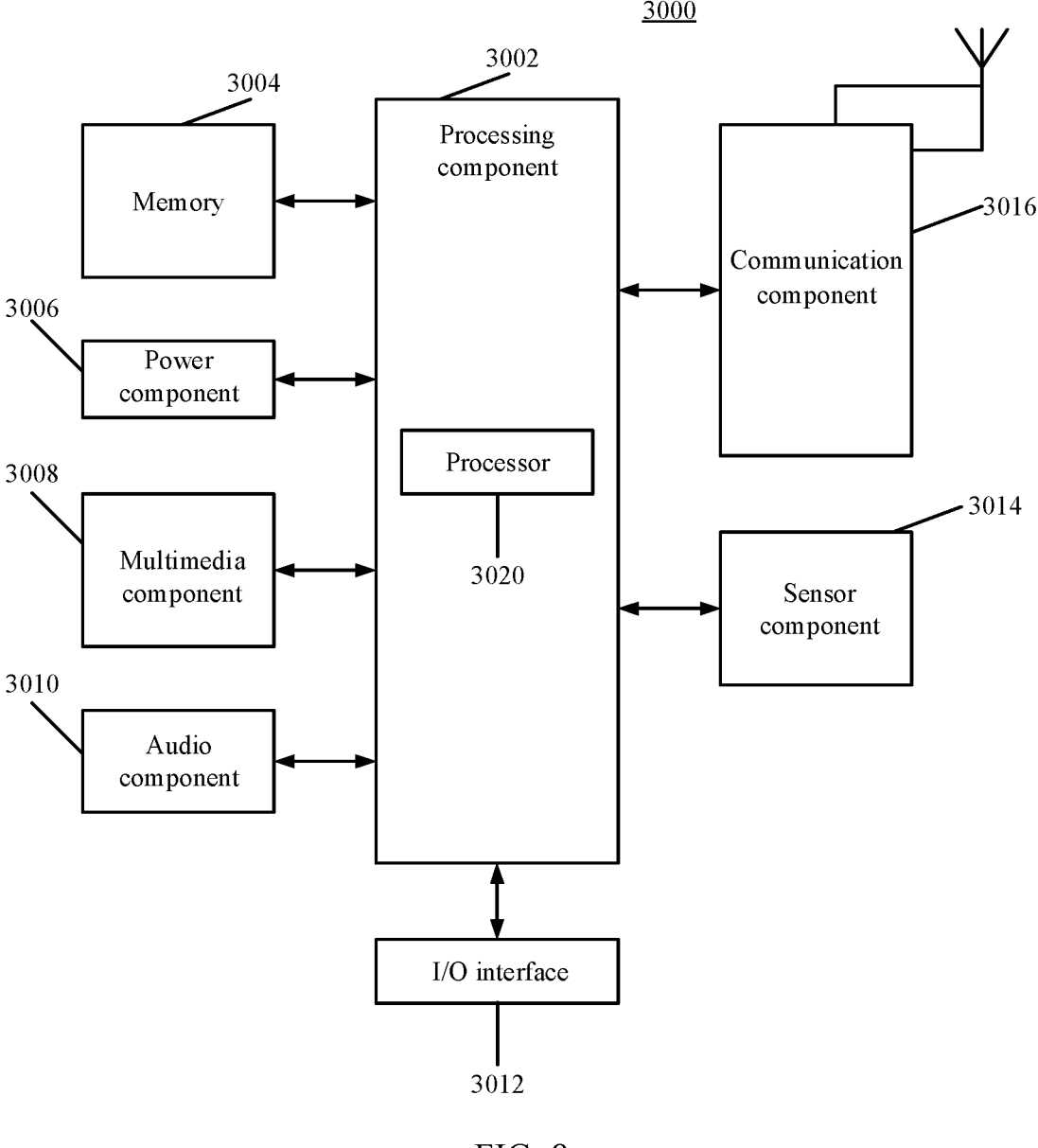
FIG. 8 is a block diagram of a device for determining handover configuration or for transmitting information according to exemplary embodiments of the present disclosure.

FIG. 8 is a block diagram of a device 3000 for determining handover configuration or for transmitting information according to exemplary embodiments. For example, device 3000 can be a mobile phone, a computer, a digital broadcasting user device, a messaging device, a game console, a tablet device, a medical device, a fitness device, a personal digital assistant, etc.

Referring to FIG. 8, device 3000 can include at least one of the following components: a processing component 3002, a memory 3004, a power component 3006, a multimedia component 3008, an audio component 3010, an input/output (I/O) interface 3012, a sensor component 3014, and a communication component 3016.

The processing component 3002 typically controls the overall operation of the device 3000, such as operations associated with display, telephone call, data communication, camera operation, and recording operations. The processing component 3002 may include one or more processors to execute instructions to complete all or part of the methods described above. In addition, the processing component 3002 may include one or more modules to facilitate interactions between the processing component 3002 and other components. For example, the processing component 3002 may include a multimedia module to facilitate interaction between the multimedia component 3008 and the processing component 3002.

The memory 3004 is configured to store various types of data to support operations in the device 3000. Examples of such data include instructions, contact data, phone book data, messages, pictures, videos, and the like for any application or method operating on the device 3000. The memory 3004 can be implemented by any type of volatile or nonvolatile storage device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or optical disk.

The power component 3006 provides power for various components of the device 3000. The power component 3006 may include a power management system, one or more power supplies, and other components associated with generating, managing, and distributing power for the device 3000.

The multimedia component 3008 includes a display screen providing an output interface between the device 3000 and the user. In some embodiments, the screen may include a liquid crystal display (LCD) and a touch panel (TP). If the screen includes a touch panel, the screen can be implemented as a touch screen to receive input signals from the user. The touch panel includes one or more touch sensors to sense touch, sliding, and gestures on the touch panel. The touch sensor can not only sense the boundaries of touch or sliding actions, but also detect the duration and pressure related to the touch or sliding operation. In some embodiments, the multimedia component 3008 includes a front camera and/or a rear camera. When the device 3000 is in operation mode, such as shooting mode or video mode, the front camera and/or rear camera can receive external multimedia data. Each front camera and rear camera can be a fixed optical lens system or have focal length and optical zoom capability.

The audio component 3010 is configured to output and/or input audio signals. For example, the audio component 3010 includes a microphone (MIC), which is configured to receive an external audio signal when the device 3000 is in an operation mode, such as a calling mode, a recording mode, and a voice recognition mode. The received audio signal may be further stored in memory 3004 or transmitted via communication component 3016. In some embodiments, the audio component 3010 also includes a speaker for outputting audio signals.

The I/O interface 3012 provides an interface between the processing component 3002 and peripheral interface modules, which can be a keyboard, click wheel, button, etc. These buttons may include, but are not limited to, the Home button, Volume button, Start button, and Lock button.

The sensor component 3014 includes one or more sensors for providing various aspects of condition evaluation for the device 3000. For example, the sensor component 3014 can detect an open/closed state of the device 3000, relative positioning of the components. The component is, for example, a display and a keypad of the device 3000. The sensor component 3014 can also detect changes in the position of the device 3000 or one component of the device 3000, presence or absence of the user's contact with the device 3000, orientation or acceleration/deceleration of the device 3000 and temperature change of the device 3000. The sensor component 3014 may include a proximity sensor configured to detect the presence of nearby objects without any physical contact. The sensor component 3014 may also include a light sensor, such as a CMOS or CCD image sensor, for use in imaging applications. In some embodiments, the sensor component 3014 may also include an acceleration sensor, a gyroscope sensor, a magnetic sensor, a pressure sensor, or a temperature sensor.

The communication component 3016 is configured to facilitate wired or wireless communication between the device 3000 and other devices. The device 3000 can access wireless networks based on communication standards, such as WiFi, 2G or 3G, or a combination thereof. In some embodiments, the communication component 3016 receives a broadcast signal or broadcast related information from an external broadcast management system via a broadcast channel. In some embodiments, the communication component 3016 also includes a near field communication (NFC) module to facilitate short range communication. For example, the NFC module can be implemented based on radio frequency identification (RFID) technology, infrared data association (IrDA) technology, ultra wideband (UWB) technology, Bluetooth (BT) technology and other technologies.

In some embodiments, the device 3000 can be implemented through one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for implementing above methods.

In some embodiments, a non-transitory computer-readable storage medium including instructions is also provided, such as a memory 3004 including instructions, which can be executed by a processor of the device 3000 to complete above methods. For example, the non-transitory computer-readable storage medium can be ROM, random access memory (RAM), CD-ROM, tapes, floppy disks, optical data storage devices, etc.

After considering the specification and practices of the present disclosure, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

It should be understood that embodiments of the present disclosure are not limited to the precise structure described above and shown in the drawings, and various modifications and changes can be made without departing from its scope. The scope of the present disclosure is limited only by the appended claims.

What is claimed is:

1. A method for determining handover configuration, performed by user equipment (UE), comprising:

determining handover configuration for a cell handover based on handover configuration information of a target service satellite associated with the cell handover, wherein the UE performs cellular mobile data communication via a satellite signal, and the handover configuration information comprises at least one of:

satellite identification information used to indicate the target service satellite for the cell handover;

beam information used to indicate a target beam for the cell handover;

cell identification information used to indicate a target cell for the cell handover;

ephemeris information of the target service satellite; or resource configuration information used to indicate a transmission resource of the target service satellite for the cell handover, wherein the transmission resource of the target service satellite comprises at least one of: a working frequency point of the target service satellite; a working bandwidth of the target service satellite; or a random access preamble sequence of the target service satellite, and wherein determining the handover configuration for the cell handover based on the handover configuration information of the target service satellite associated with the cell handover comprises: determining the target service satellite for the cell handover based on the ephemeris information of the target service satellite, and the method further comprises:

sending, in response to determining the target service satellite for the cell handover, indication information associated with the cell handover to a base station;

wherein sending the indication information associated with the cell handover to the base station comprises:

sending, in response to a duration to an end of service time of a current service satellite being greater than or equal to a duration threshold, the indication information associated with the cell handover to the base station.

2. The method according to claim 1, further comprising: receiving the handover configuration information of the target service satellite sent by the base station.

3. The method according to claim 2, further comprising: performing a wireless signal measurement based on the handover configuration, and performing the cell handover based on a measurement result obtained from the wireless signal measurement.

4. The method according to claim 3, further comprising: receiving first time indication information indicating handover time;

wherein performing the wireless signal measurement based on the handover configuration, and performing the cell handover based on the measurement result obtained from the wireless signal measurement comprises:

performing, in response to the handover time being reached, the wireless signal measurement based on the handover configuration, and performing the cell handover based on the measurement result obtained from the wireless signal measurement.

5. The method according to claim 3, further comprising: receiving trigger instruction information that triggers the cell handover;

wherein performing the wireless signal measurement based on the handover configuration, and performing the cell handover based on the measurement result obtained from the wireless signal measurement comprises:

performing, in response to receiving the trigger instruction information, the wireless signal measurement based on the handover configuration, and performing the cell handover based on the measurement result obtained from the wireless signal measurement.

6. The method according to claim 5, wherein receiving the trigger instruction information that triggers the cell handover comprises:

receiving a control instruction carrying the trigger instruction information.

7. The method according to claim 1, further comprising: determining, when more than one target service satellite is determined based on the handover configuration information, one target service satellite for the cell handover from the more than one target service satellite, based on a selection instruction from the base station or a satellite determination rule.

8. The method according to claim 1, further comprising: performing, in response to determining the target service satellite for the cell handover, a wireless signal measurement on the target service satellite, and performing the cell handover based on a measurement result obtained from the wireless signal measurement.

9. The method according to claim 1, further comprising: receiving second time indication information indicating cell handover time, the second time indication being sent by the base station in response to the indication information; and performing, in response to the cell handover time being reached, a wireless signal measurement on the target service satellite, and performing the cell handover based on a measurement result obtained from the wireless signal measurement.

10. A communication device, comprising a processor, a memory, and executable instructions stored on the memory and capable of running on the processor, wherein when the executable instructions run on the processor, steps of the method for determining handover configuration according to claim 1 is caused to be executed.

11. A non-transitory computer-readable storage medium having executable instructions stored thereon, which when executed by a processor, cause the method for determining handover configuration according to claim 1 to be implemented.

12. A method for transmitting information, performed by a base station, comprising:

sending, in response to performing of cellular mobile data communication by user equipment (UE) via a satellite signal, handover configuration information of a target service satellite, wherein the handover configuration information is used for the UE to determine handover configuration for a cell handover, and the handover configuration information comprises at least one of:

satellite identification information used to indicate the target service satellite for the cell handover;

beam information used to indicate a target beam for the cell handover;

cell identification information used to indicate a target cell for the cell handover;

ephemeris information of the target service satellite; or resource configuration information used to indicate a transmission resource of the target service satellite for the cell handover, wherein the transmission resource of the target service satellite comprises at least one of: a working frequency point of the target service satellite; a working bandwidth of the target service satellite; or a random access preamble sequence of the target service satellite; and receiving indication information associated with the cell handover, wherein the indication information associated with the cell handover is sent by the UE, in response to determination of the target service satellite for the cell handover based on the ephemeris information of the target service satellite and in response to a duration to an end of service time of a current service satellite being greater than or equal to a duration threshold.

13. The method according to claim 12, further comprising:

sending first time indication information indicating handover time for the UE to perform the cell handover; or sending trigger instruction information that instructs the UE to perform the cell handover.

14. The method according to claim 13, wherein sending the trigger instruction information that instructs the UE to perform the cell handover comprises:

sending a control instruction carrying the trigger instruction information.

15. The method according to claim 12, further comprising at least one of:

stopping, in response to receiving the indication information, scheduling of data transmission between the UE and a UE's current service satellite; or stopping, in response to receiving the indication information, scheduling of a wireless signal measurement on the UE's current service satellite performed by the UE.

16. The method according to claim 12, further comprising:

sending second time indication information indicating cell handover time for the UE to perform the cell handover.

17. A communication device, comprising a processor, a memory, and executable instructions stored on the memory and capable of running on the processor, wherein when the executable instructions run on the processor, steps of the method for transmitting information according to claim 12 is caused to be executed.

18. A non-transitory computer-readable storage medium having executable instructions stored thereon, which when executed by a processor, cause the method for transmitting information according to claim 12 to be implemented.

19. The method according to claim 12, further comprising:

sending a selection instruction, wherein the selection instruction is used for the UE to determine one target service satellite for the cell handover from more than one target service satellite determined based on the handover configuration information.

* * * * *